(12) United States Patent
Wang et al.

(10) Patent No.: US 10,779,378 B1
(45) Date of Patent: Sep. 15, 2020

(54) LIGHTING APPARATUS, METHOD AND SYSTEM FOR PROCESSING EMERGENCY PROCEDURE

(71) Applicant: WISTRON NEWEB CORPORATION, Hsinchu (TW)

(72) Inventors: Chia-Hsiang Wang, Hsinchu (TW); Chui-Sung Peng, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 0 days.

(21) Appl. No.: 16/790,821

(22) Filed: Feb. 14, 2020

(51) Int. Cl.
  *H05B 47/125* (2020.01)
  *H02J 9/06* (2006.01)
  *H04N 7/18* (2006.01)
  *F21V 23/04* (2006.01)

(52) U.S. Cl.
  CPC ....... *H05B 47/125* (2020.01); *F21V 23/0478* (2013.01); *H02J 9/065* (2013.01); *H04N 7/18* (2013.01)

(58) Field of Classification Search
  CPC .... H05B 47/125; H05B 47/10; H05B 47/105; H05B 47/19; H05B 45/00; H05B 45/10; F21V 23/0442; F21V 23/0471; F21V 23/0478; H04N 7/18; H04N 7/181; H04N 7/20; G08B 13/196606; G08B 13/19608; G08B 13/19645; G08B 13/19663; H04W 4/80; H04W 4/90; H04W 40/244; G01S 5/0231
  See application file for complete search history.

(56) References Cited

U.S. PATENT DOCUMENTS

| | | | | |
|---|---|---|---|---|
| 9,405,979 B2* | 8/2016 | Renkis | ................... | H04L 67/10 |
| 9,629,220 B2* | 4/2017 | Panopoulos | .............. | B64F 1/00 |
| 9,756,233 B2* | 9/2017 | Lee | ..................... | H04N 5/23206 |
| 10,098,074 B2* | 10/2018 | Baker | ................... | H04W 4/029 |
| 10,336,202 B2* | 7/2019 | Panopoulos | ............ | F21V 14/02 |
| 10,599,174 B2* | 3/2020 | Baker | ....................... | G05F 1/66 |
| 2005/0140783 A1* | 6/2005 | Akamatsu | .............. | H04N 7/181 |
| | | | | 348/143 |
| 2011/0221899 A1* | 9/2011 | Jeon | ........................ | H04N 7/18 |
| | | | | 348/143 |
| 2014/0252958 A1* | 9/2014 | Subotnick | ........... | F21V 23/0435 |
| | | | | 315/149 |

* cited by examiner

*Primary Examiner* — Haissa Philogene
(74) *Attorney, Agent, or Firm* — McClure, Qualey & Rodack, LLP

(57) ABSTRACT

A lighting apparatus, a method and a system for processing an emergency procedure are provided. The system includes two or more lighting apparatuses that are interconnected for forming a mesh network over an area. In the method, the lighting apparatus is activated to illuminate a surveillance zone under an emergency mode. In the meantime, a camera circuit is driven to capture a series of images of the surveillance zone for conduct motion detection. When a moving object is detected, the lighting apparatus transmits a beacon signal in response to the detection result. In the meantime, an acknowledgement signal in response to the beacon signal is generated by a signal source and received by the lighting apparatus. After that, the identifier with respect to the lighting apparatus is transmitted to a control center for obtaining the position of the lighting apparatus.

20 Claims, 8 Drawing Sheets

LIGHTING APPARATUS, METHOD AND SYSTEM FOR PROCESSING EMERGENCY PROCEDURE

FIELD OF THE DISCLOSURE

The present disclosure relates to a technology for processing an emergency procedure, and more particularly to a lighting apparatus which processes the emergency procedure, a method and a system for processing the emergency procedure using two or more emergency lighting apparatuses.

BACKGROUND OF THE DISCLOSURE

A conventional emergency lighting device is generally designed to have a backup power supply, e.g., battery, inside the device, and is used to illuminate a light during a period of power outage.

In a normal circumstance, the emergency lighting device is on a standby mode as connecting to an alternating current (AC) power source, e.g., an electrical wall outlet, for maintaining the inside battery to be fully charged. The emergency lighting device is switched to be powered by a direct current (DC) power source, i.e., the battery, for illuminating the light once a power outage state is detected.

The emergency lighting device is an important facility in a place since it takes a responsibility for illuminating emergency light in an emergency situation. For example, when a place fires, the emergency lighting device is almost the only device that still works during power outage. The emergency lighting device can assist the fire fighters to enter the fire scene and to evacuate the trapped persons.

The prior documents such as "Indoor Global Positioning System with Centimeter Accuracy Using Wi-Fi IEEE Signal Processing Magazine November 2016, Yi Han, Yan Chen, and K. J. Ray Liu 1053-5888/16©20161EEE" and "CSI-based Indoor Localization Kaishun Wu Member, IEEE Jiang Xiao, Student Member, IEEE, Youwen Yi Student Member, IEEE, Dihu Chen, Xiaonan Luo and Lionel M. Ni Fellow, IEEE" that disclosed that CSI (Channel State Information) generated by transmitter and receiver of the wireless device can be used to conduct life detection, for example CSI breathing detection and CSI motion detection, by analyzing the signals generated by the mobile device held by a person. The approaches of human detection can be used in the emergency procedure.

SUMMARY OF THE DISCLOSURE

In response to the above-referenced technical inadequacies, the present disclosure provides a lighting apparatus, a system and a method for processing emergency procedure.

According to one embodiment of the disclosure, the system includes a wireless gateway and two or more lighting apparatuses that constitute a mesh network. The lighting apparatus includes a control circuit used to operate the lighting apparatus under a first mode or a second mode, a memory unit recording an identifier used to identify the light apparatus, a lighting unit including a light source that is configured to be activated under the second mode, a communication circuit, and a camera circuit used to capture a series of images of a surveillance zone with an angle of view.

The lighting apparatus is standby under the first mode, and be activated to perform the emergency procedure under the second mode when receiving an activation signal from a control center or receiving a power-interruption signal from a power management circuit of the lighting apparatus.

In one aspect of the disclosure, the control circuit performs an emergency procedure including activating the lighting unit to illuminate the surveillance zone while operating under the second mode, using a series of images taken by the camera circuit to conduct a motion detection over the surveillance zone, and transmitting a beacon signal by the communication circuit in response to at least one moving object being detected.

After that, the control circuit determines whether an acknowledge (ACK) signal is received from a signal source and the acknowledge signal is in response to the beacon signal. When the acknowledge signal is received by the communication circuit of the lighting apparatus, the identifier with respect to the lighting apparatus is transmitted to the control center.

In one aspect of the disclosure, the control circuit starts performing the emergency procedure when receiving the power-interruption signal or the activation signal from the control center after a preset time period depending on a size of an area where the lighting apparatus is installed.

By the control circuit, the signal source can be positioned according to received signal strength indication of the received signals and a direction sensed by a directional antenna pointing to the signal source.

Alternatively, the signal source is positioned by performing an angle-of-arrival (AOA) method for calculating coordinates of the signal source based on the signals received by the lighting apparatus and signals received by another lighting apparatus from the same signal source.

In another aspect of the disclosure, the signal source is a mobile device that acts as an active tag that broadcasts the signals received by at least two lighting apparatuses, and the signal source is positioned by determining angles and distances with directions from the at least two lighting apparatuses to the signal source.

Furthermore, when the acknowledge signal is not received, the emergency procedure further performing a life detection by a CSI breathing detection or a CSI motion detection.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
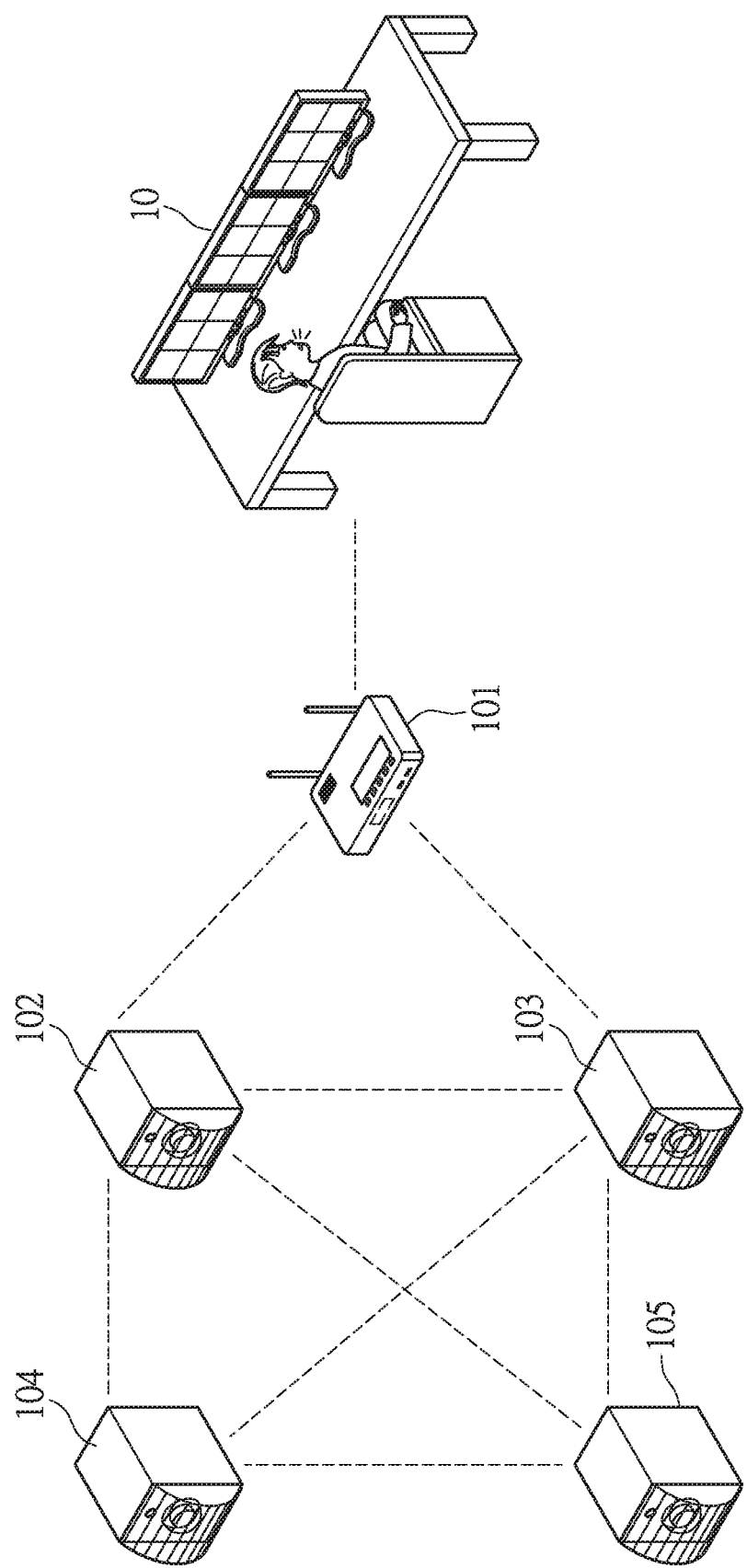
FIG. 1 is a schematic diagram depicting a network framework of a system for processing an emergency procedure according to one embodiment of the disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure is related to a lighting apparatus, a method and a system for processing emergency procedure. The system utilizes at least two lighting apparatuses to embody the method for processing the emergency procedure and of which in some embodiments the method incorporates some technologies such as motion detection, CSI (Channel State Information) life detection, and Beacon-ACK detection.

The lighting apparatus of the present disclosure is preferably an emergency lighting device that is configured to be disposed at a specific area and is especially ready for emergent conditions. For example, when a building suffers power outage, the light apparatus installed at a specific region can be switched to connect to batteries as a main power source for the apparatus automatically, instead of connecting to an alternate current (AC) power source in a normal state. According to the aspects of the disclosure, in addition to providing the emergency light when the power goes out, the lighting apparatus in the system is able to be functioned as an emergency facility for processing an emergency procedure described as following embodiments.

FIG. 1 is a schematic diagram depicting a network framework of a system for processing an emergency procedure according to one embodiment of the disclosure;

The system includes a plurality of lighting apparatuses 102, 103, 104 and 105 that are installed at various locations of a place. The lighting apparatus 102, 103, 104 and 105 can be communicated with each other via a wireless communication protocol so as to form a mesh network. The wireless communication protocol can be a mesh routing protocol that can be locally operated over the mesh network. The mesh network is a local network topology formed by a plurality of nodes that include the lighting apparatuses 102, 103, 104, 105 and some other network facilities such as a gateway device 101 or the like. Each of the lighting apparatuses is a standalone device that can operate independently, for example, the lighting apparatus generally acts as a battery-powered emergency light when the place suffers power outage.

In particular, every lighting apparatus (102, 103, 104 or 105) can also cooperate with other lighting apparatuses within the same mesh network. For example, when one of the lighting apparatuses 102, 103, 104 and 105 generates a message, the message can be transferred by other lighting apparatuses in order to transfer the message to a destination, e.g., a control center 10, through the gateway device 101. Still further, while collecting messages from other nearby lighting apparatuses, the lighting apparatus can perform motion detection in order to determine any moving object within a specific range of an area, Beacon-ACK detection for detecting a signal source, and/or CSI life detection in order to confirm if any trapped lives (e.g., human or animal) can be found in the area.

In one embodiment of the disclosure, the plurality of lighting apparatuses 102, 103, 104 and 105 are configured to be installed at designated locations and the control center 10 records identifiers with respect to the plurality of lighting apparatuses 102, 103, 104 and 105. Therefore, the control center is able to identify the message sent by any of the apparatuses. The control center 10 can serve as an emergency center for responding to a disaster, e.g., a fire accident, appropriately since it can effectively collect instant information regarding to the locations where the disaster occurs through the plurality of lighting apparatuses 102, 103, 104 and 105.

In one exemplary example of the disclosure, since the plurality of lighting apparatuses 102, 103, 104 and 105 are wirelessly communicated with each other over the mesh network, the images generated by the apparatuses, channel state information (CSI) and collected signals can be transferred among the apparatuses via a wireless communication protocol. In one aspect, CSI can be used to acknowledge the channel properties of the communication links. CSI is referred to as a reference to acknowledge how a signal propagates among the apparatuses 102, 103, 104 and 105. Therefore, the control center 10 can use the information of CSI to conduct disaster relief when it receives CSI and corresponding identifiers from one or more of the plurality of lighting apparatuses 102, 103, 104 and 105. For example, the control center 10 or any of the lighting apparatuses 102, 103, 104 and 105 can perform CSI breathing detection or CSI motion detection. It should be noted that the CSI breathing detection is a technology that uses CSI signals to recognize the number of breaths of the trapped lives who carries a device generating the wireless signals by analyzing the amplitudes of sub-carriers of CSI; and the CSI motion detection is a technology for identifying the motion of the trapped lives who carries the device generating the wireless signals by analyzing propagation of the wireless signals. Similarly, the system can also rely on the images or signals obtained from these lighting apparatuses to perform the abovementioned motion detection and Beacon-ACK detection.

In one embodiment, the identifier may be an encoded data which can be used to identify the lighting apparatus. After receiving the encoded data, the control center can decode the encoded data so as to identify the corresponding lighting apparatus. Further, the identifier can also be expressed by a serial number. For example, a serial number '01000' is as a kind of the identifier.

Figure 2:
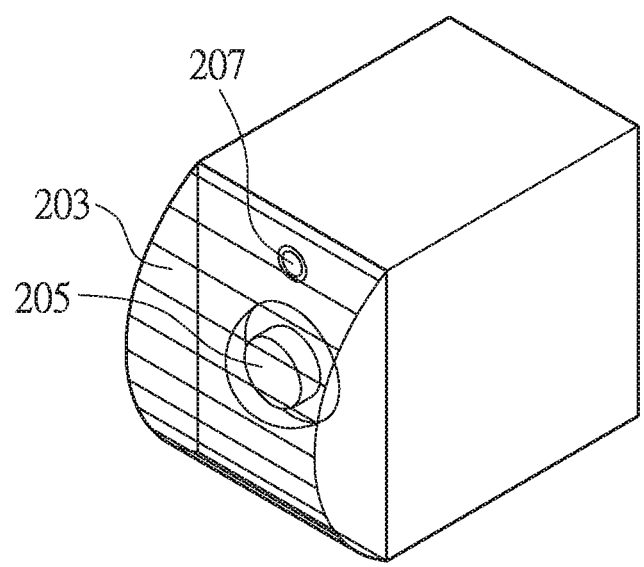
FIG. 2 is a schematic diagram depicting main components of a lighting apparatus in one embodiment of the disclosure.

FIG. 2 is a schematic diagram depicting main components of a lighting apparatus in one embodiment of the disclosure.

A lighting apparatus 20 is shown in the diagram. The lighting apparatus 20 includes an emergency lighting source 205 that is used to light the place where the lighting apparatus 20 is installed in order to light up the place encountering power outage. A condenser 203 can also be disposed to cover the emergency lighting source 205. The condenser 203 allows the light emitted by the emergency lighting source 205 to be concentrated in a desired range over the area and also makes the light more obvious for avoiding too much diffusion of the light.

The lighting apparatus 20 includes a camera unit 207. For example, the camera unit 207 is controlled by a control circuit of the lighting apparatus 20 for capturing a series of images of a zone covering the region. After that, when the control center or any device receives the series of images of the zone, a motion detection process can be performed using the series of images so as to determine if any trapped life stays in the zone. The control center can also locate the trapped person according to the identifier of the lighting apparatus 20 which generates the images when it is determined that one or more lives are in the zone.

Furthermore, the camera unit 207 is designed to be rotatable through a specific mechanism for adjusting an angle of view of the camera. The camera unit 207 can be controlled by the control center for capturing the images over a surveillance zone. The lighting apparatus 20 with the camera unit 207 can therefore be used to monitor a disaster site by collecting images of the site. It is beneficial for the control center to identify the location through the images.

Figure 3:
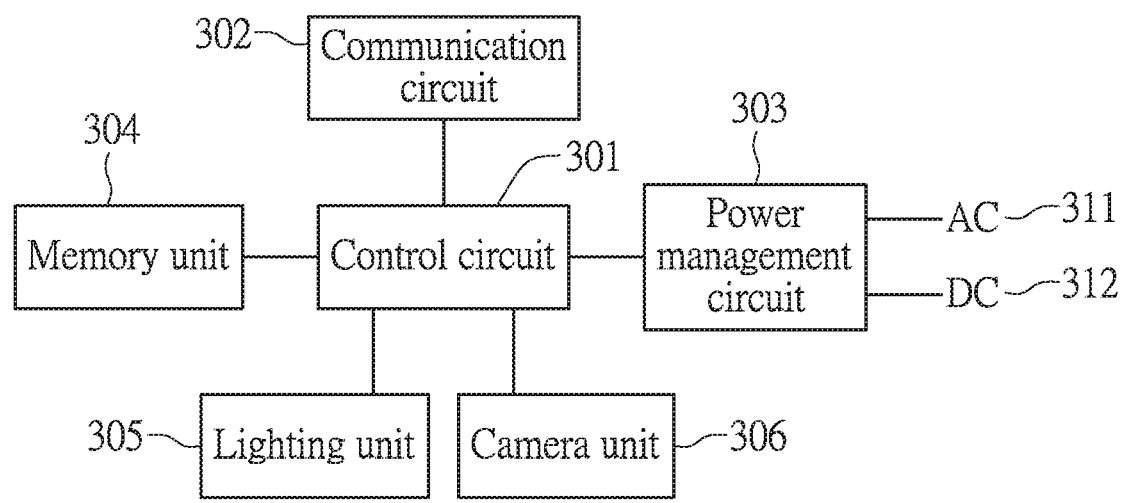
FIG. 3 is a block diagram depicting circuit components of the lighting apparatus in one embodiment of the disclosure.

FIG. 3 is a block diagram depicting circuit components of the lighting apparatus in one embodiment of the disclosure.

One of the main components of a lighting apparatus is a control circuit 301. The control circuit 301 is used to operate the lighting apparatus with a first mode or a second mode. The first mode exemplarily indicates a normal mode that the lighting apparatus is continuously charged by connecting to an alternate current power source (AC 311). The second mode exemplarily indicates an emergency mode that the lighting apparatus is switched to be power by a direct current power source (DC 312) due to the AC power is outage. For example, the lighting apparatus is standby under the first mode, and it is activated to illuminate the color or the pattern under the second mode when receiving an activation signal from a control center or a power-interruption signal generated by a power management circuit 303.

The power management circuit 303 of the lighting apparatus is electrically connected with the control circuit 301 and also linked to both the AC 311 and the DC 312 that are ready for the lighting apparatus under the first mode or the second mode. When the place where the lighting apparatus is installed suffers a power outage, the power management circuit 303 generates the power-interruption signal to the control circuit 301 due to the AC 311 is gone. The power-interruption signal makes the control circuit 301 to switch to the DC 312 automatically. Further, the lighting apparatus can also be activated to the second mode by a remote control, i.e. the control center.

The lighting apparatus includes a communication circuit 302 used to establishing communication channel with other lighting apparatuses over the mesh network and especially supporting a specific wireless communication protocol such as WiFi™, Bluetooth™, BLE, Zigbee or the like. The communication circuit 302 is controlled by the control circuit 301 in order to convert signals generated by the control circuit 301 to a specific format of a communication protocol. The signals are transmitted by the communication circuit 302. The communication circuit 302 also receives the signals from another device over the mesh network.

The lighting apparatus has a memory unit 304 that can be a main memory of the lighting apparatus and can also be a memory circuit for storing data. For example, the memory circuit stores an identifier that is used to locate the light apparatus. Further, the data stored in the memory unit 304 includes the signals received from other lighting apparatuses over the mesh network.

The lighting apparatus includes a camera unit 306 that primarily integrates a photosensitive element, a lens, a memory for buffering the images, and a rotary mechanism. The rotary mechanism allows the camera unit 306 to be controlled by the control circuit 301 for taking images in a specific direction by adjusting its angle of view. For example, the images captured by the camera unit 306 can be used to perform motion detection by scanning the region through images. Once the trapped lives are detected, the camera unit 306 of the lighting apparatus can be controlled to capture the images of the lives. The control center can identify the location when receiving the images with the information of identifier of the apparatus by querying a lookup table that records the identifier corresponding to the lighting apparatus. Further, the control center allows an administrator (or automatically) to remotely control the light apparatus that is associated with the identifier to be received to perform the motion detection process in order to determine if any life is in the zone through the camera unit 306. Therefore, when the lighting apparatus sends the images taken by the camera unit 306 to the control center, the control center can recognize the trapped lives and also identify the location according to the identifier associated with the images.

Figure 4:
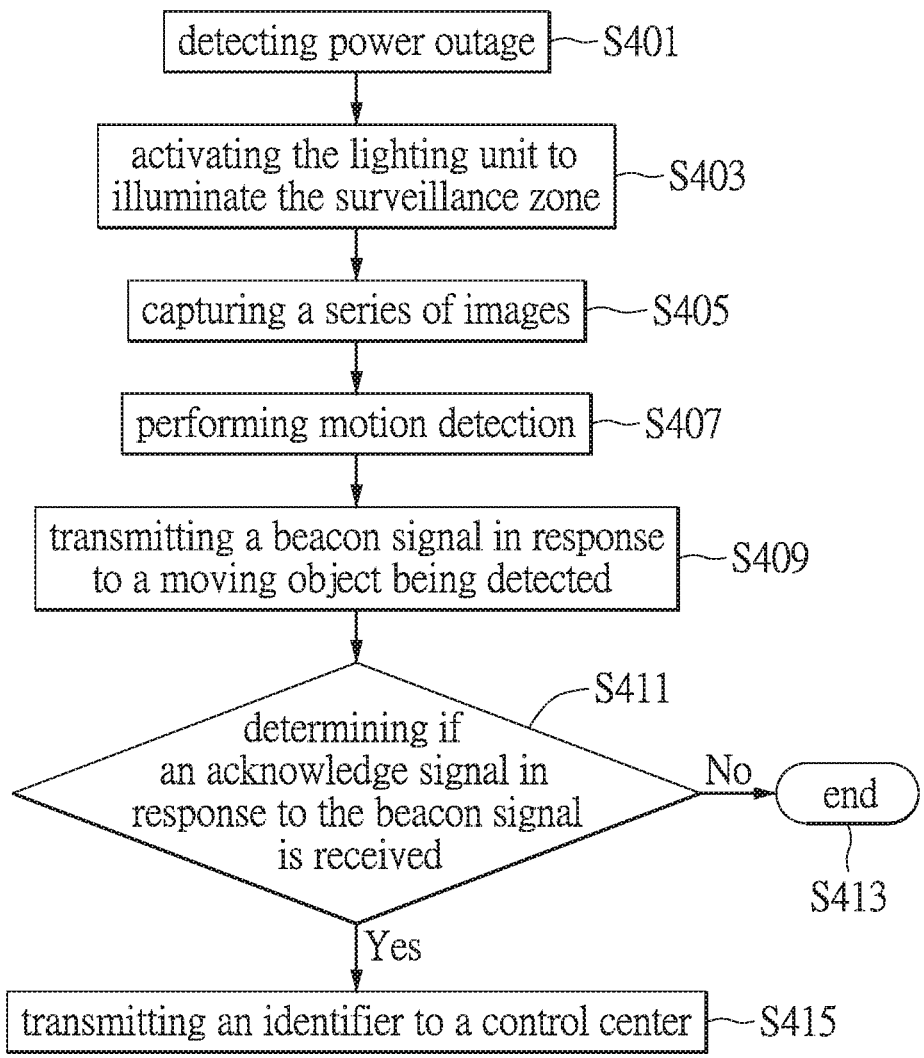
FIG. 4 shows a flow chart describing a main procedure of a method for processing emergency procedure according to one embodiment of the disclosure.

Reference is made to FIG. 4 which shows a flow chart describing a main procedure of a method for processing emergency procedure according to one embodiment of the disclosure.

The lighting apparatus is generally standby under a first mode. The lighting apparatus can be activated to perform the method described below under a second mode when receiving an activation signal from the control center or receiving a power-interruption signal from the power management circuit of the lighting apparatus.

In first step S401 of the procedure, power outage occurring to a place is detected by one of a plurality of lighting apparatuses of the system. In step S403, a power-interruption signal is generated by the power management circuit of the lighting apparatus. The lighting unit of the lighting apparatus is then activated to illuminate the surveillance zone under the second mode when turning the emergency light source in response to the power-interruption signal. In another aspect, the lighting apparatus can also be activated by a remote control signal made by the control center or based on any circumstance.

In step S405, the lighting apparatus starts capturing a series of images over a specific surveillance zone when its camera unit is driven by the control circuit, and performs motion detection over the surveillance zone, such as in step S407. In an exemplary example of the disclosure, when the images are generated by the lighting apparatus, the images can be processed by the lighting apparatus for performing motion detection if the lighting apparatus is capable of processing the images.

In step S409, in the lighting apparatus, a beacon signal is generated and transmitted by the communication circuit to the nearby area when at least one moving object is detected by the motion detection process. In step S411, in response to the beacon signal, an acknowledge signal may be generated by a device that acknowledges the beacon signal. It should be noted that the beacon signal can be generated by the lighting apparatus only when any moving object has been detected so as to prevent interference of the additional signals. In the lighting apparatus, a software procedure performed in the control circuit of the lighting apparatus is standby for determining if the acknowledge signal in response to the beacon signal is received from the signal source. Once the receiving the acknowledge signal, the lighting apparatus transmits its identifier to the control center, such as in step S415 for notifying that there is beacon signal being received; otherwise, if there is not acknowledge signal to be received, the emergency procedure is ended, such as in step S413.

According to one of the embodiments of the disclosure, the system for processing the emergency procedure may utilize one or more approaches to detect the lives who are trapped in the surveillance zones where the plurality of lighting apparatuses are installed. The following embodiments disclose several approaches for life detection adopted in the system.

There are many technologies to position a signal source based on the information of the signals. For example, by a control circuit of the lighting apparatus, the signal source can be positioned according to received signal strength indication (RSSI) of the received signals and a direction sensed by a directional antenna of the lighting apparatus pointing to the signal source. However, rather than RSSI, CSI provides additional information that can achieve a scheme to position the signal source.

Each of the plurality of the lighting apparatuses in the system for processing emergency procedure has a communication circuit that is preferably a wireless unit for communicating with other devices. More specifically, probe signals may be generated and broadcasted among the transmitters and receivers of the lighting apparatuses over the mesh network. Therefore, the CSI carried by the signals broadcasted by the mobile devices held by the lives can be received by the lighting apparatuses. CSI allows the lighting apparatuses which receive the CSI to perform life detection.

Figure 5:
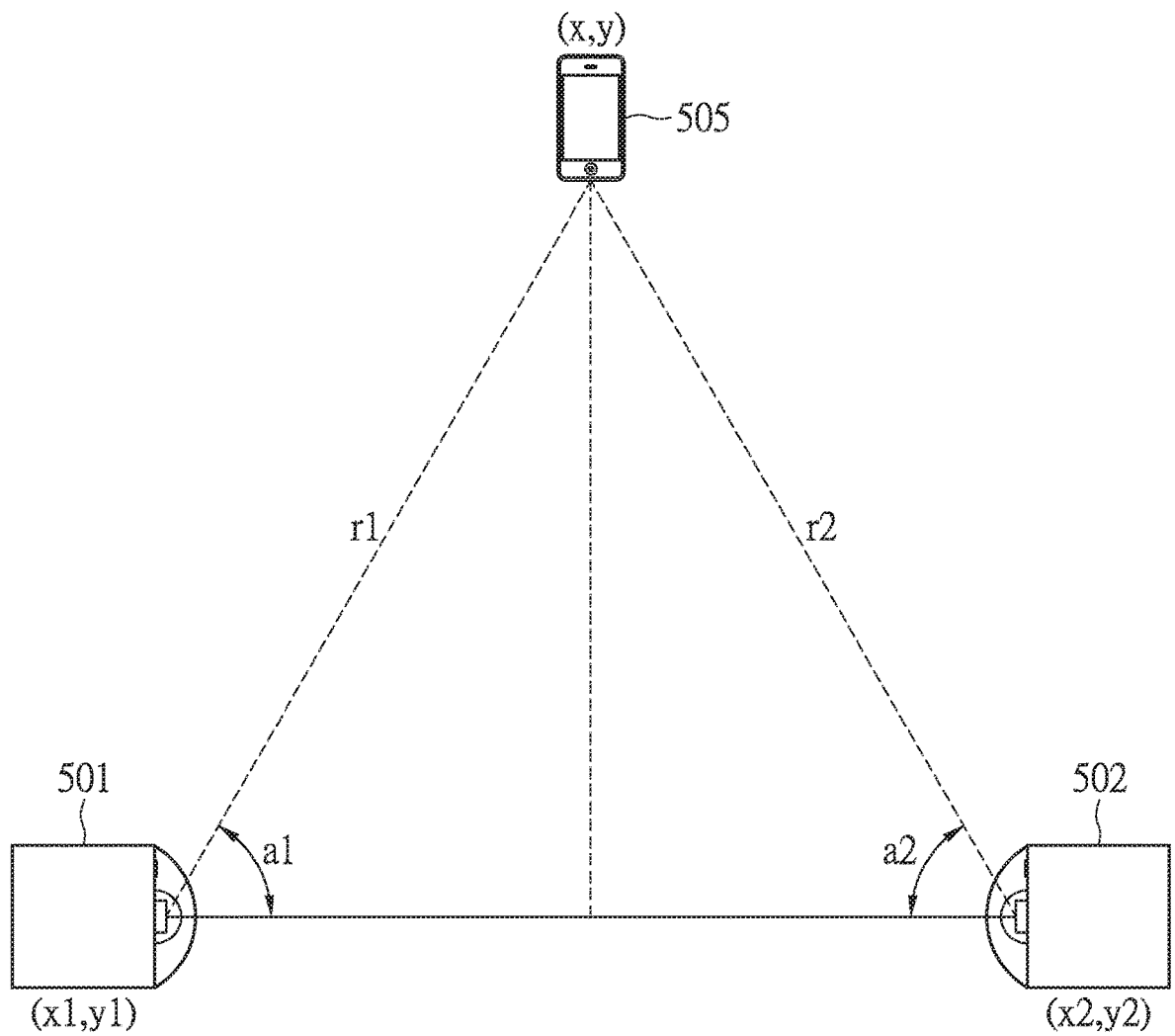
FIG. 5 shows a schematic diagram describing a method of AOA object detection performed in the emergency procedure in one embodiment of the disclosure.

In one further aspect of the disclosure, such as the embodiment shown in FIG. 5, a process of AOA object detection is performed in the emergency procedure for probing the signal source in one embodiment of the disclosure. The signal source can be positioned by performing the AOA object detection for calculating coordinates (x, y) of the signal source based on the signals received by two different lighting apparatuses (501, 502).

In the present embodiment, two lighting apparatuses 501 and 502 separated by a distance are shown in the diagram. The lighting apparatuses 501 and 502 are disposed at two different locations specified by the system. The locations of the two lighting apparatuses 501 and 502 are given to the system since they can be identified by their unique identifiers and their locations can be represented by coordinates (x1, y1) and (x2, y2) respectively. A mobile device 505 appears at a place. The mobile device 505 acts as an active tag, i.e., the signal source, that broadcasts wireless signals, and the wireless signals can be received by one or more nearby lighting apparatuses, i.e., the lighting apparatuses 501 and 502.

When the lighting apparatus 501 or 502 receives the wireless signals from the mobile device 505, RSSI (Received Signal Strength Indication) can be calculated by the control circuit of the lighting apparatus for estimating a distance, e.g., distance r1 or r2, from the signal source in accordance with measurement of power level of the radio frequency (RF). Furthermore, by the control circuit of the lighting apparatus, a direction, e.g., angle a1 or a2, pointing to the signal source can also be sensed by the directional antenna of the lighting apparatus.

When the signal generated by the signal source, i.e., the mobile device 505, can be received by at least two lighting apparatuses 501 and 502 with the coordinates (x1, y1) and (x2, y2), the signal source (x, y) can therefore be positioned by determining angles (a1, a2) and distances (r1, r2) with different directions from the at least two lighting apparatuses 501 and 502 to the signal source. Specifically, the distances (r1, r2) can be calculated based on RSSI. The angles (a1, a2) can be measured based on the directions from the lighting apparatuses 501 and 502 pointing to the signal source. The lighting apparatuses can accurately position the signal source according to the angles (a1, a2), the distances (r1, r2), and the identifiers with respect to the lighting apparatuses which receive the signals from the signal source. Then the position of signal source (x, y) can be transmitted to control center.

It should be noted that the data of position of the signal source can be transmitted to the control center when the signal source is well positioned by the above method. Further, along with the data used to position the signal source, only the identifier of the lighting apparatus that receives the ACK signal from the signal source is transmitted to the control center. For example, the coordinates ((x1, y1), (x2, y2)) of the lighting apparatuses 501 and 502 are transmitted to the control center when both the lighting apparatuses 501 and 502 receive the ACK signal from the mobile device 505. Therefore, the control center acknowledges that the signal source is within the intersection region of the wireless coverages of the lighting apparatuses 501 and 502.

Figure 6:
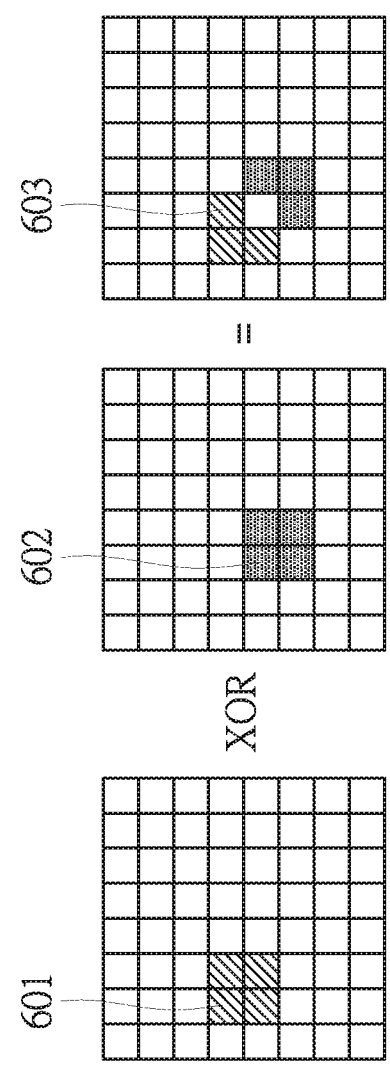
FIG. 6 is a schematic diagram depicting the method of image motion detection performed in the emergency procedure in one further embodiment of the disclosure.
Figure 7:
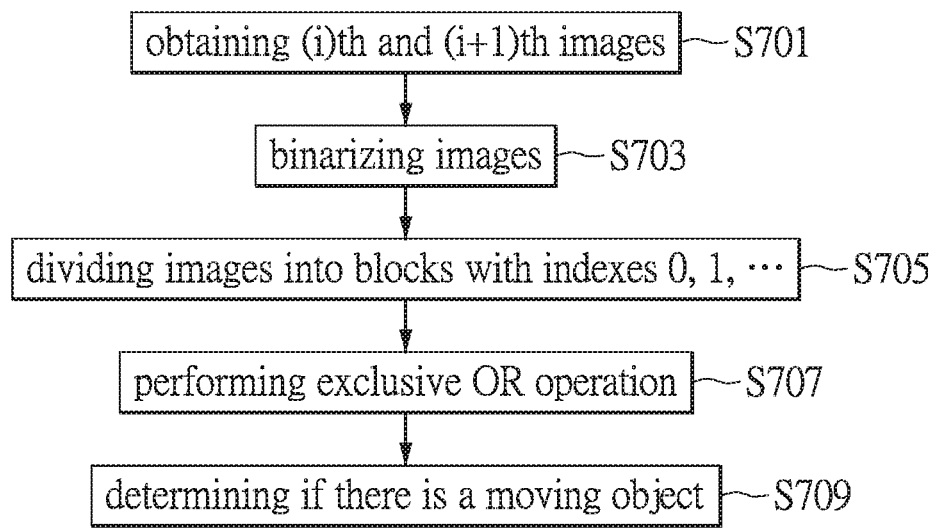
FIG. 7 shows a flow chart describing the method of image motion detection in one embodiment of the disclosure.

FIG. 6 is a schematic diagram depicting the method of image motion detection performed in the emergency procedure, and FIG. 7 shows a flow chart describing the method in one further embodiment of the disclosure.

A zone with a specific two-dimensional range of an image is shown in the diagram. The image is taken by the camera unit of the lighting apparatus. A series of images to be taken by the camera circuit can be used to determine one or more moving objects within the zone by an image-processing method.

To implement the motion detection, a series of images should be firstly obtained from the lighting apparatus. For example, two consecutive images are labeled by (i)th and (i+1)th images (step S701, FIG. 7). The images can be used for determining whether or not any difference is found between two or more consecutive image frames. In the method, the (i)th and (i+1)th images are binarized in advance for the motion detection (step S703, FIG. 7). The image is therefore divided into blocks with indexes 0, 1, etc.

for further calculation. Reference is also made to the binarized (i)th image 601 and the binarized (i+1)th image 602 of FIG. 6.

Next, any moving object can be detected by comparing a previous frame image and a following frame image of the series of binarized images. For example, such as in step S707 of FIG. 7, an exclusive OR operation is performed between the (i)th image 601 and the (i+1)th image 602, and a result such as the object image 603 can be obtained. In step S709, the object image 603 acts as a reference for determining if there is a moving object.

Figure 8:
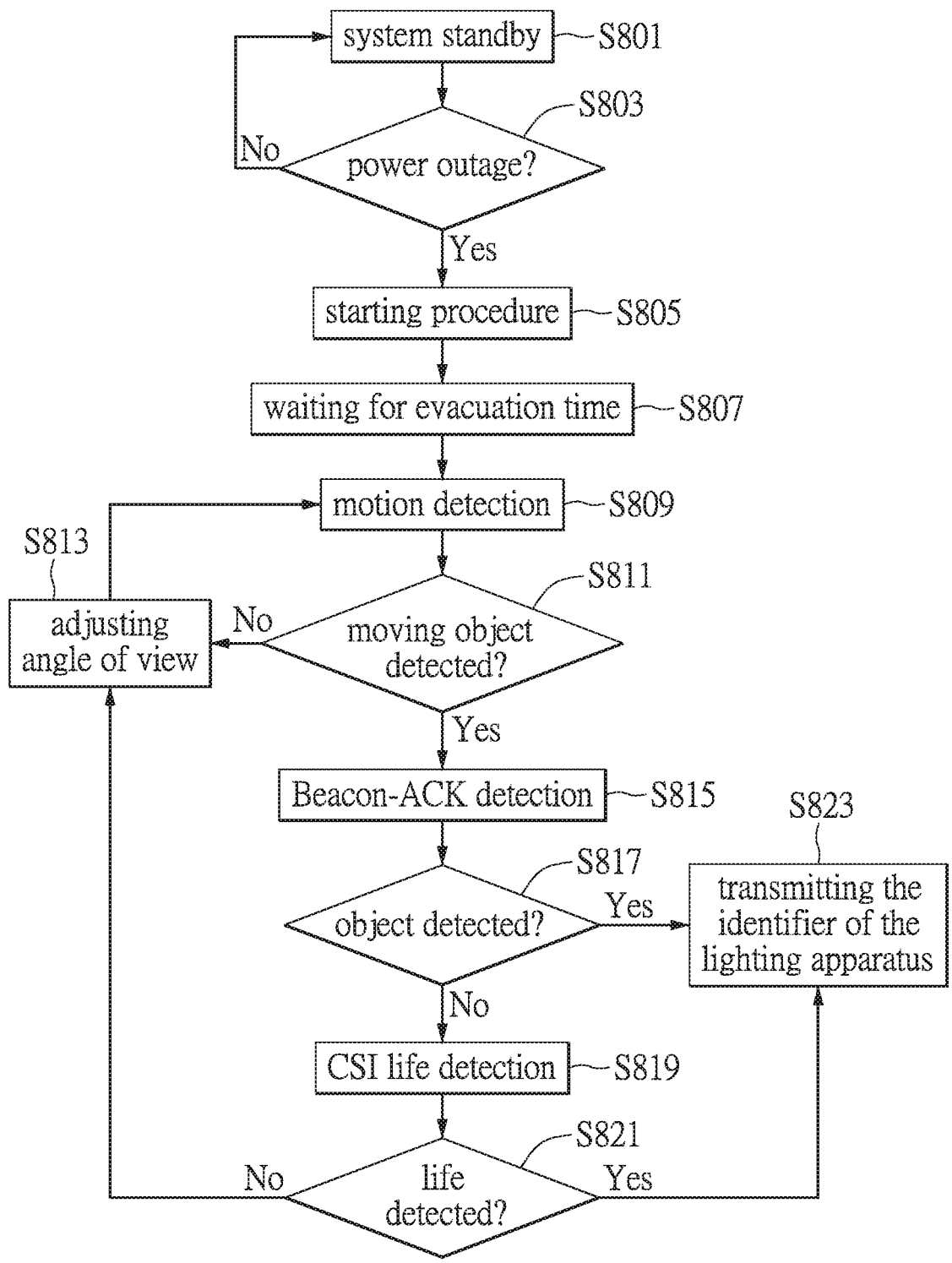
FIG. 8 shows a flow chart describing an overall process of the method for processing emergency procedure according to one embodiment of the disclosure.

According to the description of the above embodiments, the method uses several approaches to detect if any lives trapped in the surveillance zone. The method for processing emergency procedure can be performed based on the mentioned approaches. For example, the mobile device held by the life trapped in the surveillance zone act as an AOA active tag which can be positioned according to the signals generated by the tag. Further, the images taken by the nearby lighting apparatus can be used to determine the moving object through image processing technology. Still further, CSI can also be used to perform life detection. FIG. 8 shows a flow chart describing an overall process of the method for processing emergency procedure based on the mentioned approaches according to one embodiment of the disclosure.

The lighting apparatuses of the system are generally on standby at a place under the first mode (step S801) and a software procedure running in the control circuit of every apparatus continuously checks if meeting power outage (step S803). If there is no signal indicative of power outage state, the lighting apparatuses are still on standby; otherwise, the one or more lighting apparatuses can be activated to start the emergency procedure as receiving a power-interruption signal or any activation signal when the place suffers power outage (step S805).

It should be noted that the control circuit of the lighting apparatus performs the method when receiving the power-interruption signal or the activation signal from the control center after a preset time period depending on a size of an area where the lighting apparatus is installed. The present time period is set up for waiting for evacuation time (step S807) that is provided for the trapped lives to escape the place. After the present time period, the procedure performs motion detection (step S809) according to the images taken by the lighting apparatus that is activated from the first mode in order to detect if there is any moving object in the place (step S811).

If there is no moving object to be detected in the place, in one embodiment, the camera unit of the lighting apparatus is controlled to adjust its angle of view (step S813). On the contrary, the procedure goes on performing a Beacon-ACK detection process (step S815) if at least on moving object is detected. When performing the Beacon-ACK detection process, the procedure determines whether or not any object is detected (step S817).

In step S817, when at least one object acting as the signal source is detected, the procedure goes to step S823 for transmitting the identifier of the lighting apparatus which receives ACK signal in response to a beacon signal. In another embodiment, in the step 823, the AOA object detection process can be performed to obtain the specific position of the signal source and transmit the position of the signal source to the control center. Otherwise, when there is no object to be detected, the procedure performs CSI life detection (step S819). In step S821, the procedure determines if there is any life, i.e. the trapped lives, to be detected. The procedure goes on transmitting the identifier of the lighting apparatus (step S823) if the trapped lives are found by CSI life detection. On the contrary, the angle of view of the camera unit of the lighting apparatus can be adjusted (step S813) for capturing other images if there is no life to be detected.

In conclusion, according to the description of the embodiments, the system utilizes two or more lighting apparatuses that are interconnected to establish a mesh network and also to perform emergency procedure. The method provides an efficient solution to position the trapped lives when any disaster happens. In the method, when a result of the motion detection, the angle-of-arrival method or the life detection is generated, the identifier(s) with respect to the related lighting apparatus(s) is transmitted by the communication unit and also broadcasted to the two or more lighting apparatuses over the mesh network and finally to the control center. The control center or the lighting apparatus can successfully position the trapped lives. After that, an evacuation route can also be transferred to the lives trapped to be positioned, and the lives can escape from the place according to the route.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A lighting apparatus, comprising:
   a control circuit used to operate the lighting apparatus under a first mode or a second mode;
   a memory unit recording an identifier that is used to identify the position of the light apparatus;
   a lighting unit, controlled by the control circuit, including a light source that is configured to be activated under the second mode;
   a communication circuit, controlled by the control circuit, used to transmit signals generated by the control circuit or receive signals from another device; and
   a camera circuit, controlled by the control circuit, used to capture a series of images of a surveillance zone with an angle of view;
   wherein the control circuit performs an emergency procedure comprising:
      activating the lighting unit to illuminate the surveillance zone while operating under the second mode;
      using a series of images taken by the camera circuit to conduct a motion detection over the surveillance zone;
      transmitting a beacon signal by the communication circuit in response to at least one moving object being detected;
      determining whether an acknowledge signal is received from a signal source and the acknowledge signal is in response to the beacon signal; and
      transmitting the identifier to a control center when the acknowledge signal is received by the communication circuit.

2. The apparatus according to claim 1, wherein the lighting apparatus is standby under the first mode, and be activated to perform the emergency procedure under the second mode when receiving an activation signal from the control center or receiving a power-interruption signal from a power management circuit of the lighting apparatus.

3. The apparatus according to claim 2, wherein the control circuit starts performing the emergency procedure when receiving the power-interruption signal or the activation signal from the control center after a preset time period.

4. The apparatus according to claim 1, wherein, by the control circuit, the signal source is positioned according to received signal strength indication of the received signals and a direction sensed by a directional antenna pointing to the signal source.

5. The apparatus according to claim 4, wherein the signal source is positioned by performing an angle-of-arrival (AOA) method for calculating coordinates of the signal source based on the signals received by the lighting apparatus and signals received by another lighting apparatus from the same signal source; wherein the signal source is a mobile device that acts as an active tag that broadcasts the signals received by at least two lighting apparatuses, and the signal source is positioned by determining angles and distances from the at least two lighting apparatuses to the signal source.

6. The apparatus according to claim 1, wherein, when the acknowledge signal is not received, the emergency procedure further performing a life detection by a CSI breathing detection or a CSI motion detection.

7. The apparatus according to claim 6, wherein, when a result being generated by the CSI breathing detection or the CSI motion detection shows that any life is detected in the surveillance zone, the identifier is transmitted by the communication circuit of the lighting apparatus to the control center.

8. The apparatus according to claim 6, wherein, when a result being generated by the CSI breathing detection or the CSI motion detection shows that no life is detected in the surveillance zone, the camera circuit of the lighting apparatus is controlled by the control circuit to adjust the angle of view for capturing other images of the surveillance zone.

9. The apparatus according to claim 1, wherein the series of images taken by the camera circuit are binarized in advance and then used for the motion detection, in which a moving object is detected by comparing a previous frame image and a following frame image of the series of binarized images.

10. A method for processing an emergency procedure, adapted to a lighting apparatus, comprising:
    activating a lighting unit of the lighting apparatus to illuminate a surveillance zone under a second mode;
    driving a camera circuit of the lighting apparatus to capture a series of images of the surveillance zone to conduct a motion detection over the surveillance zone;
    transmitting a beacon signal by a communication circuit of the lighting apparatus in response to at least one moving object being detected;
    determining whether an acknowledge signal is received from a signal source and the acknowledge signal is in response to the beacon signal; and
    transmitting an identifier of the lighting apparatus to a control center when the acknowledge signal is received by the communication circuit of the lighting apparatus, wherein the identifier is used to identify the position of the light apparatus.

11. The method according to claim 10, wherein the lighting apparatus is standby under the first mode, and be activated to perform the method under the second mode when receiving an activation signal from the control center or receiving a power-interruption signal from a power management circuit of the lighting apparatus.

12. The method according to claim 11, wherein, a control circuit of the lighting apparatus starts performing the method when receiving the power-interruption signal or the activation signal from the control center after a preset time period.

13. The method according to claim 10, wherein, by a control circuit of the lighting apparatus, the signal source is positioned according to received signal strength indication of the received signals and a direction sensed by a directional antenna of the lighting apparatus pointing to the signal source.

14. The method according to claim 13, wherein the signal source is positioned by performing an angle-of-arrival (AOA) method for calculating coordinates of the signal source based on the signals received by the lighting apparatus and signals received by another lighting apparatus from the same signal source; wherein the signal source is a mobile device that acts as an active tag that broadcasts the signals received by at least two lighting apparatuses, and the signal source is positioned by determining angles and distances from the at least two lighting apparatuses to the signal source.

15. The method according to claim 10, wherein, when the acknowledge signal is not received, the emergency procedure further performing a life detection by a CSI breathing detection or a CSI motion detection.

16. The method according to claim 15, wherein, when a result being generated by the CSI breathing detection or the CSI motion detection shows that any life is detected in the surveillance zone, the identifier is transmitted by the communication circuit of the lighting apparatus to the control center.

17. The method according to claim 15, wherein, when a result being generated by the CSI breathing detection or the CSI motion detection shows that no life is detected in the surveillance zone, the camera circuit of the lighting apparatus is controlled by the control circuit to adjust the angle of view for capturing other images of the surveillance zone.

18. The method according to claim 10, wherein the series of images taken by the camera circuit are binarized in advance and then used for the motion detection, in which a moving object is detected by comparing a previous frame image and a following frame image of the series of binarized images.

19. A system for processing an emergency procedure, comprising:
    a wireless gateway;
    two or more lighting apparatuses, which are interconnected and connected with the wireless gateway, forming a mesh network over an area;
    wherein each of the two or more lighting apparatuses comprises:
        a control circuit used to operate the lighting apparatus under a first mode or a second mode;
        a memory unit recording an identifier that is used to identify the position of the light apparatus;
        a lighting unit, controlled by the control circuit, including a light source that is configured to be activated under the second mode;
        a communication circuit, controlled by the control circuit, used to transmit signals generated by the control circuit or receive signals from another device; and a camera circuit, controlled by the control circuit, used to capture a series of images of a surveillance zone with an angle of view;

wherein the control circuit performs an emergency procedure comprising:

activating the lighting unit to illuminate the surveillance zone while operating under the second mode;

using a series of images taken by the camera circuit to conduct a motion detection over the surveillance zone;

transmitting a beacon signal by the communication circuit in response to at least one moving object being detected;

determining whether an acknowledge signal is received from a signal source and the acknowledge signal is in response to the beacon signal; and transmitting the identifier to a control center when the acknowledge signal is received by the communication circuit.

20. The system according to claim 19, wherein the lighting apparatus is standby under the first mode, and be activated to perform the emergency procedure under the second mode when receiving an activation signal from the control center or receiving a power-interruption signal from a power management circuit of the lighting apparatus.

* * * * *